US008234319B2

(12) United States Patent
Krithivasan et al.

(10) Patent No.: US 8,234,319 B2
(45) Date of Patent: Jul. 31, 2012

(54) SYSTEM AND METHOD OF PERFORMING TWO'S COMPLEMENT OPERATIONS IN A DIGITAL SIGNAL PROCESSOR

(75) Inventors: Shankar Krithivasan, Austin, TX (US); Christopher Edward Koob, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1484 days.

(21) Appl. No.: 11/137,070

(22) Filed: May 25, 2005

(65) Prior Publication Data

US 2006/0282238 A1    Dec. 14, 2006

(51) Int. Cl.
G06F 7/00 (2006.01)
(52) U.S. Cl. ......... 708/203; 708/200; 708/490; 708/700
(58) Field of Classification Search .................... None
See application file for complete search history.

(56) References Cited

U.S. PATENT DOCUMENTS

| | | | |
|---|---|---|---|
| 4,926,371 A * | 5/1990 | Vassiliadis et al. ........... 708/628 |
| 6,523,050 B1 | 2/2003 | Dhablania et al. |
| 6,629,115 B1 | 9/2003 | Rossignol |
| 6,704,762 B1 | 3/2004 | Inoue |
| 2003/0005267 A1 | 1/2003 | Koba et al. |
| 2005/0050134 A1 * | 3/2005 | Winterrowd ................. 708/620 |

FOREIGN PATENT DOCUMENTS

| | | |
|---|---|---|
| EP | 811908 A1 * | 12/1997 |
| JP | 63-182738 | 7/1988 |
| JP | 02115929 | 4/1990 |
| JP | 06051956 | 2/1994 |
| JP | 9269891 A | 10/1997 |
| JP | 10-124484 | 5/1998 |

(Continued)

OTHER PUBLICATIONS

Vassiliadis, S, et al: "The Sum-Absolute-Difference Motion Estimation Accelerator", Euromicro Conference, 1998. Proceedings. 24th Vasteras, Sweden Aug. 25-27, 1998, Los Alamitos, CA, USA, IEEE Comput. Soc, US, vol. 2, Aug. 25, 1998, pp. 559-566.

(Continued)

*Primary Examiner* — Lewis A Bullock, Jr.
*Assistant Examiner* — Michael D Yaary
(74) *Attorney, Agent, or Firm* — Peter Michael Kamarchik; Nicholas J. Pauley; Jonathan T. Velasco

(57) ABSTRACT

A method of completing a two's complement operation includes receiving a plurality of byte values and splitting the plurality of byte values into a first portion and a second portion. Further, the method includes inputting the first portion to a first segment of a first four-to-two compressor, performing a first four-to-two compression operation on the first portion to generate a first set of results having a first row and a second row that is offset one bit from the first row, and carrying in a first value of one to complete a first two's complement operation. The method also includes inputting the second portion to a second segment of a second four-to-two compressor and adding two values of one immediately to the right of the second portion in order to carry in a second value of one to the second portion to complete a second two's complement operation.

33 Claims, 9 Drawing Sheets

FOREIGN PATENT DOCUMENTS

| | | |
|---|---|---|
| JP | 2000-076046 | 3/2000 |
| JP | 2001147804 | 5/2001 |
| TW | 396321 | 7/2000 |

OTHER PUBLICATIONS

Slingerland, N. T., et al: Multimedia Extensions for General Purpose Microprocessors and Microsystems, IPC Business Press Ltd. London, GB, vol. 29, No. 5, Nov. 10, 2004, pp. 225-246.

A 32×32-B Multiplier Using a New Method to Reduce a Compression Level of Partial Products; pp. 447-458; The Institute of Electronics Engineers of Korea Paper Collection 40th Volume; Sep. 2003.

International Search Report—PCT/US06/020635, International Search Authority—European Patent Office—Oct. 16, 2006.

Written Opinion—PCT/US06/020635, International Search Authority—European Patent Office—Oct. 16, 2006.

\* cited by examiner

SYSTEM AND METHOD OF PERFORMING TWO'S COMPLEMENT OPERATIONS IN A DIGITAL SIGNAL PROCESSOR

BACKGROUND

I. Field

The present disclosure generally relates to digital signal processors and devices that use such processors. More particularly, the disclosure relates to performing two's complement operations within a digital signal processor.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Some of the programs that provide the functionality of the different devices incorporated within a wireless telephone include instructions that require two's complement operations. For example, a sum of absolute differences can require a two's complement for a difference value that is negative. The two's complement of a particular byte value can be determined by inverting each bit within the byte and adding a one to the inverted result. The use of two's complement operations can increase the hardware within a digital signal processor.

Accordingly it would be advantageous to provide an improved system and method for performing two's complement operations within a digital signal processor.

SUMMARY

A method of completing a two's complement operation is disclosed and includes receiving a plurality of byte values and splitting the plurality of byte values into a first portion and a second portion. Further, the method includes inputting the first portion to a first segment of a first four-to-two compressor, performing a first four-to-two compression operation on the first portion to generate a first set of results having a first row and a second row that is offset one bit from the first row, and carrying in a first value of one to complete a first two's complement operation.

In a particular embodiment, the method also includes inputting the second portion to a second segment of a second four-to-two compressor and adding two values of one immediately to the right of the second portion in order to carry in a second value of one to the second portion to complete a second two's complement operation. Further, in a particular embodiment, the method includes performing a second four-to-two compression operation on the second portion to generate a second set of results having a first row and a second row that is offset one bit from the first row.

In another particular embodiment, the method includes inputting a third value of one to an offset bit of the second row of the first set of results in order to complete a third two's complement operation. Additionally, the method can include a fourth value of one to an offset bit of the second row of the second set of results in order to complete a fourth two's complement operation. The method can also include inputting the first set of results to a first three-to-two compressor along with a first accumulator value and performing a first three-to-two compression operation on the first set of results and the accumulator value to generate a third set of results having a first row and a second row that is offset one bit from the first row.

In still another particular embodiment, the method includes inputting the second set of results to a second three-to-two compressor along with a second accumulator value and performing a second three-to-two compression operation on the second set of results and the accumulator value to generate a fourth set of results having a first row and a second row that is offset one bit from the first row. Also, the method includes inserting a fifth value of one to an offset bit of the second row of the third set of results in order to complete a fifth two's complement operation. Moreover, the method includes inserting a sixth value of one to an offset bit of the second row of the fourth set of results in order to complete a sixth two's complement operation.

In another particular embodiment, the method comprises inputting the third set of results to a first carry propagate adder (CPA) and performing a first CPA operation on the third set of results. Further, the method includes carrying in a seventh value of one in order to complete a seventh two's complement operation and generating a fifth set of results. Additionally, in a particular embodiment, the method includes inputting the fourth set of results to a second carry propagate adder (CPA) and performing a second CPA operation on the fourth set of results. Also, the method can include carrying in an eighth value of one in order to complete an eight two's complement operation and generating a sixth set of results. The method can also include writing the fifth set of results to a first portion of a register and writing the sixth set of results to a second portion of the register.

In another embodiment, a method of completing one or more two's complement operations is disclosed and includes determining eight sub word difference byte values, determining a sign of each sub word difference byte value, and inverting each of the eight sub word difference byte values that are negative to produce a set of inverted sub word difference byte values. Further, in this embodiment, the method includes inputting each of the eight sub word difference byte values that are positive to a reduction tree and inputting each of the set of inverted sub word difference byte values to the reduction tree.

In yet another embodiment, an instruction execution unit is provided and includes a first four-to-two compressor and a control module that is coupled to the first four-to-two compressor. In this embodiment, the control module includes logic to split eight byte values into a first group of four byte values and a second group of four byte values, logic to use the first four-to-two compressor to compress the first group of four byte values to a first set of results having a first row and a second row, logic to carry-in a first value of one while compressing the first group of four byte values in order to complete a first two's complement operation, and logic to input a second value of one to an offset bit of the second row within the first set of results in order to complete a second two's complement operation.

In still another embodiment, a digital signal processor is provided and includes a memory, a sequencer that is responsive to the memory, a register file that is coupled to the memory, and an instruction execution unit that is responsive to the sequencer. In this embodiment, the instruction execution unit includes a first four-to-two compressor, a second four-to-two compressor, a first three-to-two compressor that is coupled to the first four-to-two compressor, a second three-to-two compressor that is coupled to second four-to-two compressor, a first carry propagate adder that is coupled to the first three-to-two compressor, and a second carry propagate adder that is coupled to the second three-to-two compressor. Further, a control module is coupled to the first four-to-two compressor, the second four-to-two compressor, the first three-to-two compressor, the second three-to-two compressor, the first carry propagate adder, and the second carry propagate adder. The control module includes logic to split eight byte values into a first group of four byte values and a second group of four byte values, logic to use the first four-to-two compressor to compress the first group of four byte values to a first set of results having a first row and a second row, logic to carry-in a first value of one while compressing the first group of four byte values in order to complete a first two's complement operation, and logic to input a second value of one to an offset bit of the second row within the first set of results in order to complete a second two's complement operation.

In yet still another embodiment, a portable communicating device is disclosed and includes a digital signal processor. The digital signal processor includes a memory, a sequencer that is responsive to the memory, a register file that is coupled to the memory, and an instruction execution unit that is responsive to the sequencer. The instruction execution unit includes a first four-to-two compressor, a second four-to-two compressor, a first three-to-two compressor that is coupled to the first four-to-two compressor, a second three-to-two compressor that is coupled to second four-to-two compressor, a first carry propagate adder that is coupled to the first three-to-two compressor, and a second carry propagate adder that is coupled to the second three-to-two compressor. A control module is coupled to the first four-to-two compressor, the second four-to-two compressor, the first three-to-two compressor, the second three-to-two compressor, the first carry propagate adder, and the second carry propagate adder. The control module can include logic to complete up to eight two's complement operation while processing eight byte values using the first four-to-two compressor, the second four-to-two compressor, the first three-to-two compressor, the second three-to-two compressor, the first carry propagate adder; and the second carry propagate adder.

In another embodiment, a processor device is disclosed and includes means for receiving a plurality of byte values, means for splitting the plurality of byte values into a first portion byte values and a second portion of byte values, means for inputting the first portion of byte values to a bottom half of a first four-to-two compressor, means for performing a first four-to-two compression operation on the first portion of byte values to generate a first set of results having a first row and a second row that is offset one bit from the first row, and means for carrying in a value of one to complete a first two's complement operation.

In yet another embodiment, a processor device is provided and includes means for determining eight sub word difference byte values, means for determining the sign of each sub word difference byte value, means for inverting each negative sub word difference byte value to yield an inverted sub word difference byte value, means for inputting each positive sub word difference byte value to a reduction tree, means for inputting each inverted sub word difference byte value to the reduction tree, and means for completing up to eight two's complement operations by adding up to eight one's while performing a plurality of reduction operations on the eight sub word difference byte values.

An advantage of one or more embodiments disclosed herein can include completing up to eight two's complement operations while performing multiple byte reduction operations within a digital signal processor.

Another advantage can include substantially reducing the hardware necessary to perform two's complement operations within a digital signal processor.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
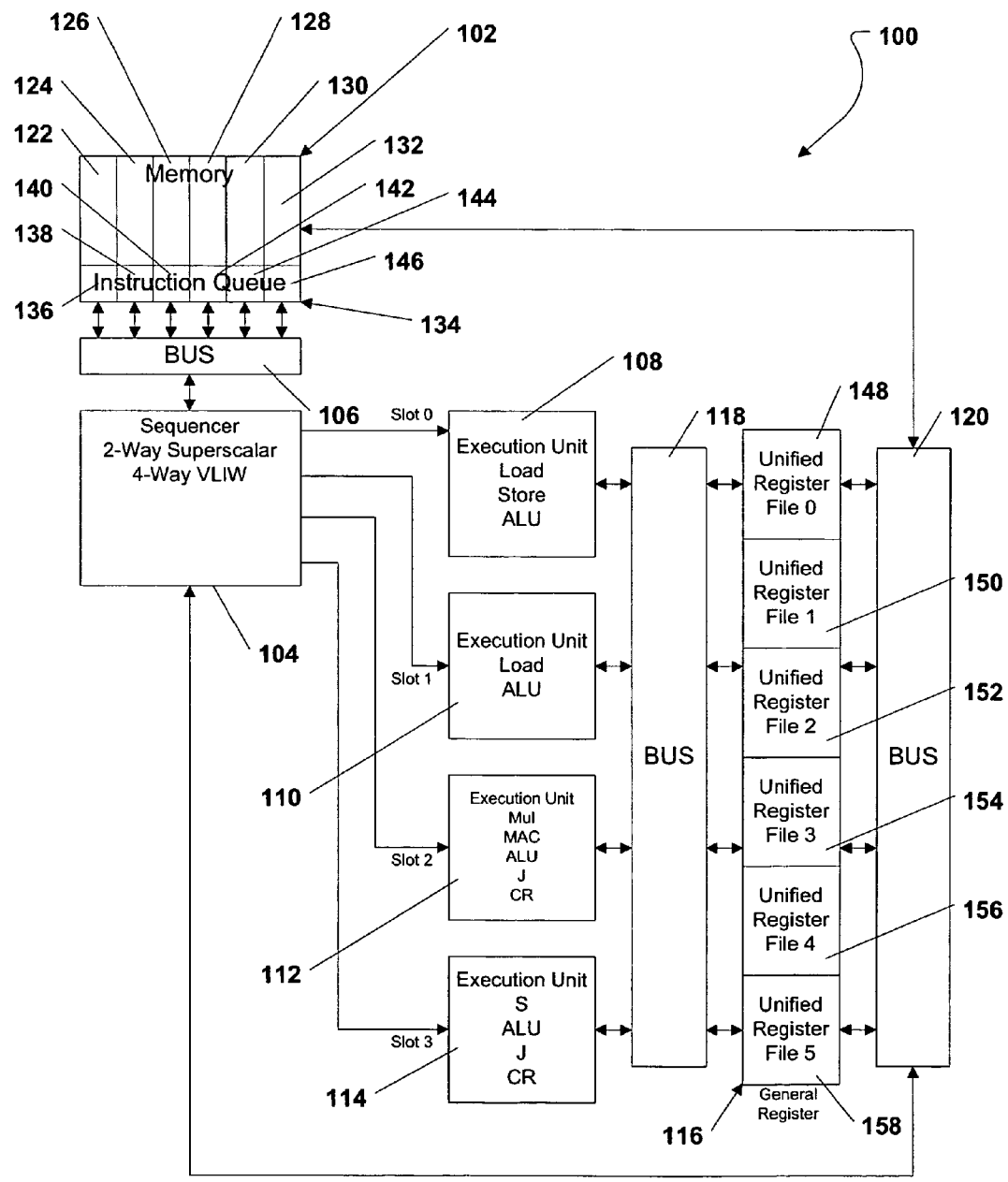
FIG. 1 is a general diagram of an exemplary digital signal processor.

FIG. 1 illustrates a block diagram of an exemplary, non-limiting embodiment of a digital signal processor (DSP) 100. As illustrated in FIG. 1, the DSP 100 includes a memory 102 that is coupled to a sequencer 104 via a bus 106. As used herein, the word coupled can indicate that two or more components are directly coupled or indirectly coupled. In a particular embodiment, the bus 106 is a sixty-four (64) bit bus and the sequencer 104 is configured to retrieve instructions from the memory 102 having a length of thirty-two (32) bits or sixty-four (64) bits. The bus 106 is coupled to a first instruction execution unit 108, a second instruction execution unit 110, a third instruction execution unit 112, and a fourth instruction execution unit 114. FIG. 1 indicates that each instruction execution unit 108, 110, 112, 114 can be coupled to a general register file 116 via a first bus 118. The general register file 116 can also be coupled to the sequencer 104 and the memory 102 via a second bus 120.

In a particular embodiment, the memory 102 includes a first instruction cache 122, a second instruction cache 124, a third instruction cache 126, a fourth instruction cache 128, a fifth instruction cache 130, and a sixth instruction cache 132. During operation, the instruction caches 122, 124, 126, 128, 130, 132 can be accessed independently of each other by the sequencer 104. Additionally, in a particular embodiment, each instruction cache 122, 124, 126, 128, 130, 132 includes a plurality of instructions, instruction steering data for each instruction, and instruction pre-decode data for each instruction.

As illustrated in FIG. 1, the memory 102 can include an instruction queue 134 that includes an instruction queue for each instruction cache 122, 124, 126, 128, 130, 132. In particular, the instruction queue 134 includes a first instruction queue 136 that is associated with the first instruction cache 122, a second instruction queue 138 that is associated with the second instruction cache 124, a third instruction queue 140 that is associated with the third instruction cache 126, a fourth instruction queue 142 that is associated with the fourth instruction cache 128, a fifth instruction queue 144 that is associated with the fifth instruction cache 130, and a sixth instruction queue 146 that is associated with the sixth instruction cache 132.

During operation, the sequencer 104 can fetch instructions from each instruction cache 122, 124, 126, 128, 130, 132 via the instruction queue 134. In a particular embodiment, the sequencer 104 fetches instructions from the instruction queues 136, 138, 140, 142, 144, 146 in order from the first instruction queue 136 to the sixth instruction queue 146. After fetching an instruction from the sixth instruction queue 146, the sequencer 104 returns to the first instruction queue 136 and continues fetching instructions from the instruction queues 136, 138, 140, 142, 144, 146 in order.

In a particular embodiment, the sequencer 104 operates in a first mode as a 2-way superscalar sequencer that supports superscalar instructions. Further, in a particular embodiment, the sequencer also operates in a second mode that supports very long instruction word (VLIW) instructions. In particular, the sequencer can operate as a 4-way VLIW sequencer. In a particular embodiment, the first instruction execution unit 108 can execute a load instruction, a store instruction, and an arithmetic logic unit (ALU) instruction. The second instruction execution unit 110 can execute a load instruction and an ALU instruction. Also, the third instruction execution unit can execute a multiply instruction, a multiply-accumulate instruction (MAC), an ALU instruction, a program redirect construct, and a transfer register (CR) instruction. FIG. 1 further indicates that the fourth instruction execution unit 114 can execute a shift (S) instruction, an ALU instruction, a program redirect construct, and a CR instruction. In a particular embodiment, the program redirect construct can be a zero overhead loop, a branch instruction, a jump (J) instruction, etc.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, 158 corresponds to an instruction cache 122, 124, 126, 128, 130, 132 within the memory 102. Further, in a particular embodiment, each unified register file 148, 150, 152, 154, 156, 158 has the same construction and includes a number of data operands and a number of address operands.

During operation of the digital signal processor 100, instructions are fetched from the memory 102 by the sequencer 104, sent to a designated instruction execution unit 108, 110, 112, 114, and executed at the instruction execution unit 108, 110, 112, 114. Further, one or more operands are retrieved from the general register 116, e.g., one of the unified register files 148, 150, 152, 154, 156, 158 and used during the execution of the instructions. The results at each instruction execution unit 108, 110, 112, 114 can be written to the general register 116, i.e., to one of the unified register files 148, 150, 152, 154, 156, 158.

Figure 2:
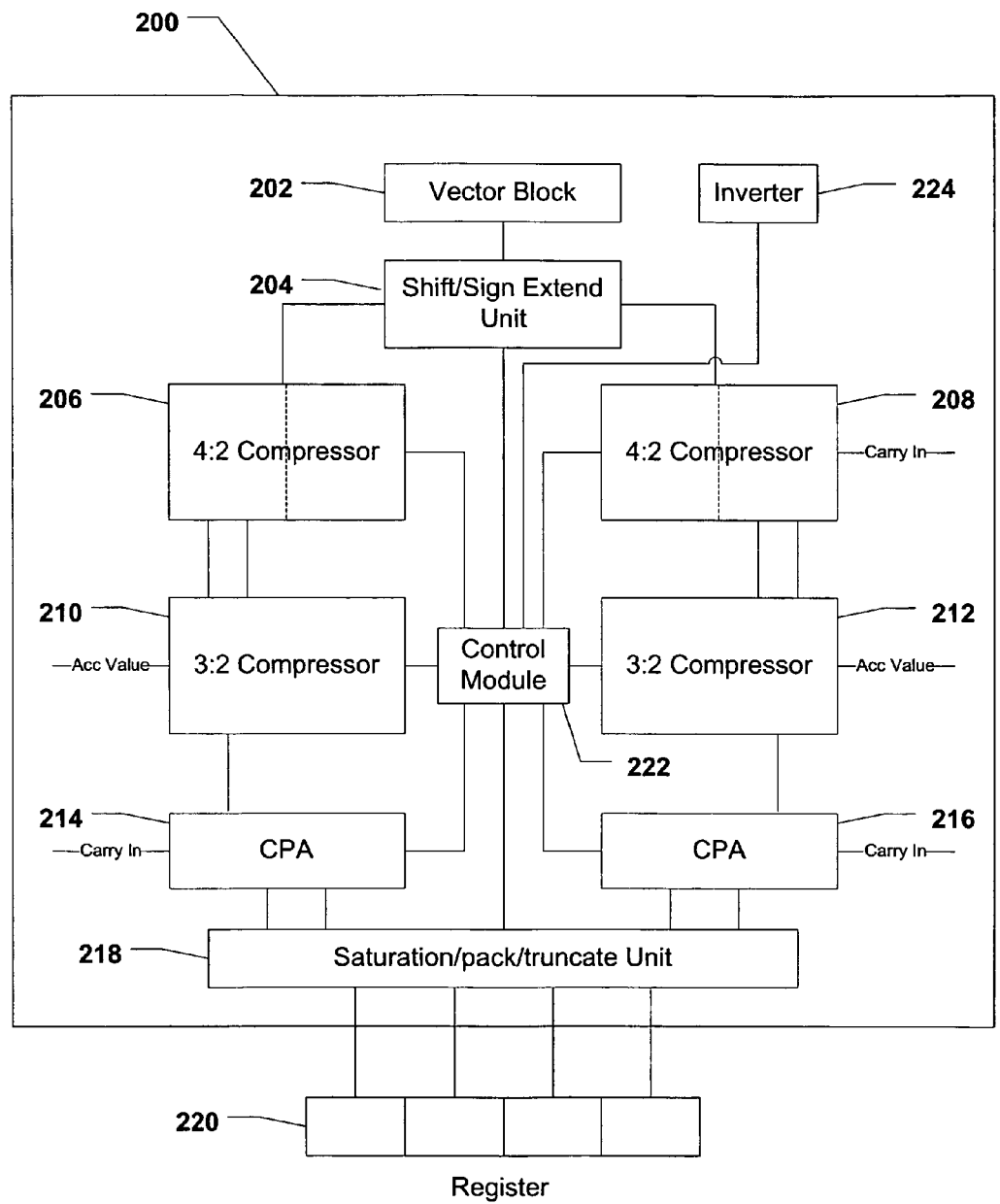
FIG. 2 is a diagram illustrating an exemplary instruction execution unit.

Referring to FIG. 2, an exemplary, non-limiting embodiment of an instruction execution unit is shown and is generally designated 200. In a particular embodiment, the instruction execution unit 200 can be incorporated into the system 100 shown in FIG. 1. For example, the instruction execution unit 200 shown in FIG. 2 can replace the fourth instruction execution unit 114. As depicted in FIG. 2, the instruction execution unit 200 includes a vector block 202 coupled to a shift/sign extend unit 204. Further, a first 4:2 compressor 206 and a second 4:2 compressor 208 is coupled to the shift/sign extend unit 204. In a particular embodiment, a first 3:2 compressor 210 is coupled to the first 4:2 compressor 206. Moreover, in a particular embodiment, a second 3:2 compressor 212 can be coupled to the second 4:2 compressor 208.

FIG. 2 also indicates that a first carry propagate adder (CPA) 214 can be coupled to the first 3:2 compressor 210. Also, a second CPA 216 can be coupled to the second 3:2 compressor 212. As depicted in FIG. 2, in an illustrative embodiment, a saturation/pack/truncate unit 218 is coupled to the first CPA 214 and the second CPA 216. A control module 220 can be coupled to the shift/sign extend unit 204, the first 4:2 compressor 206, the second 4:2 compressor 208, the first 3:2 compressor 210, the second 3:2 compressor 212, the first CPA 214, and the second CPA 216. Also, as indicated in FIG. 2, the instruction execution unit 200 can be coupled to a register 220 and the results of the compression operations and the CPA operations can be written to the register 220. FIG. 2 further shows that an inverter 224 can be coupled to the control module 222.

Figure 3:
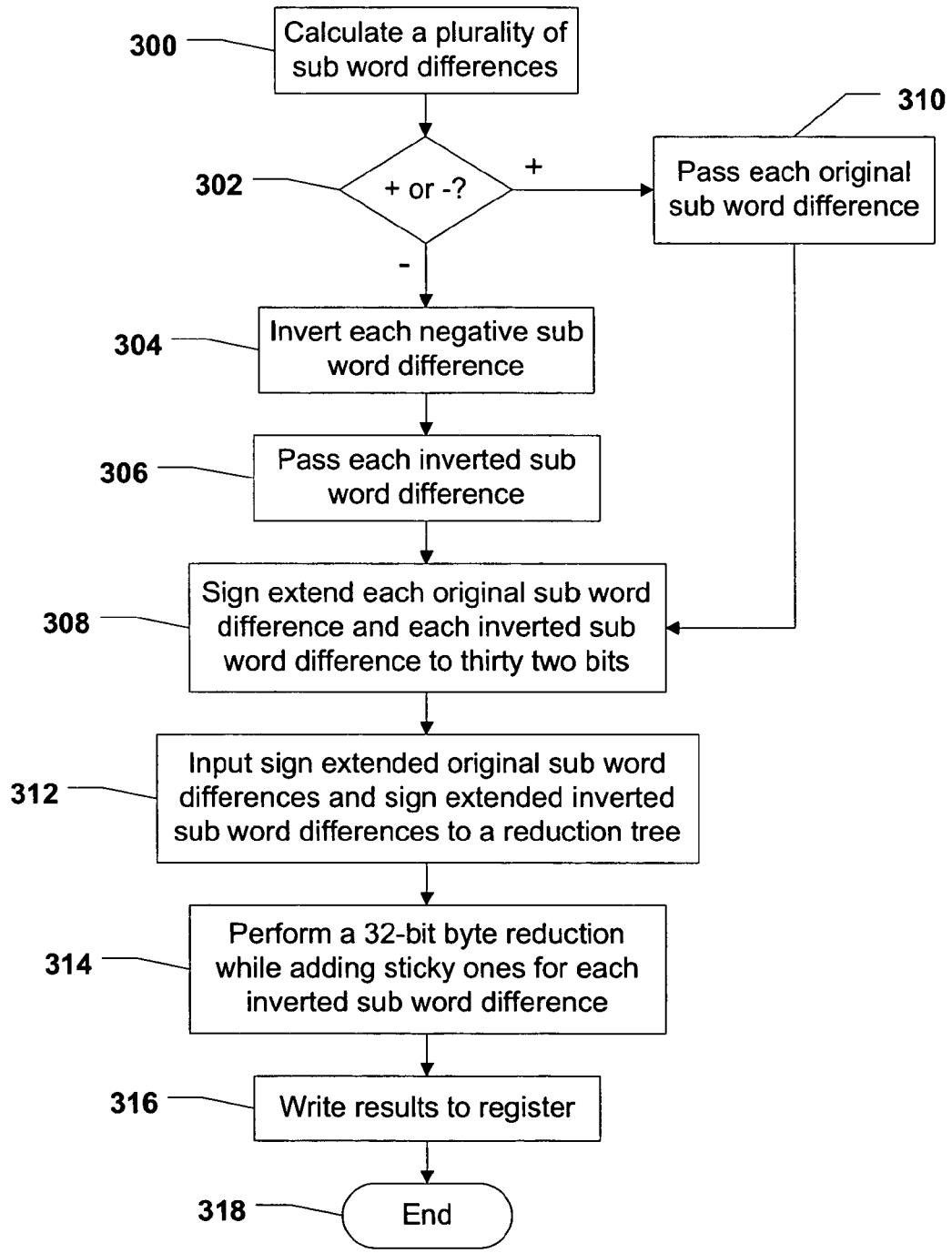
FIG. 3 is a flow chart illustrating a method of performing a sum of absolute differences on multiple instruction words.

FIG. 3 shows an exemplary, non-limiting embodiment of a method of performing multiple two's complement operations within an instruction execution unit of a digital signal processor, such as the instruction execution unit 200 shown in FIG. 2. Beginning at block 300, a plurality of sub word differences are calculated. In a particular embodiment, each of the plurality sub word differences is a byte that is eight bits wide. Further, each sub word difference represents the difference between a first portion of a first word and a first portion of a second word or the difference between a second portion of the first word and a second portion of the second word. Moving to decision step 304, the shift/sign extend unit determines whether the sign of each sub word difference is positive or negative.

At block 304, each negative sub word difference is inverted. Thereafter, at block 306, each inverted sub word difference is passed to the shift/sign extend unit, e.g., from a vector block coupled to the shift/sign extend unit. The method then proceeds to block 308. Returning to decision step 302, if the sign of a sub word difference is positive, the method proceeds to block 310 and the original sub word difference is passed to the shift/sign extend unit. Thereafter, the logic proceeds to block 308.

At block 308, the shift/sign extend unit sign extends each original sub word difference and each inverted sub word difference to thirty-two bits. Moving to block 312, the sign/shift extender inputs the sign extended original sub word differences and the sign extended inverted sub word differences to a reduction tree that includes a pair of 4:2 compressors, a pair of 3:2 compressors, and a pair of carry propagate adders. At block 314, the reduction tree performs a thirty-two bit byte reduction on the sub word differences input thereto while adding "sticky" ones for each inverted sub word difference in order to complete a two's complement operation for each inverted sub word difference. Next, at block 316, the reduction tree writes results of the byte reduction to a register. The method then ends at state 318.

Figure 4:
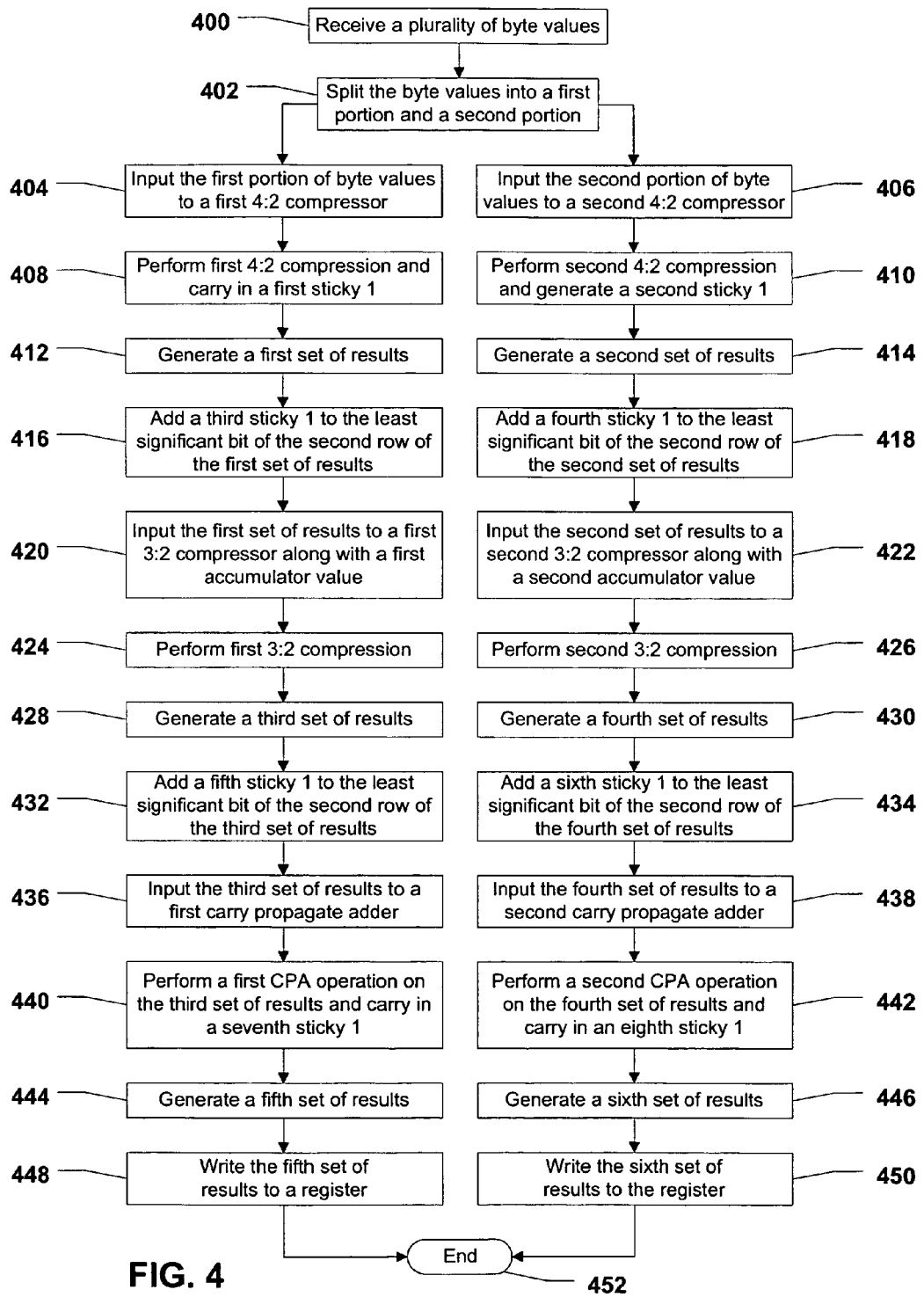
FIG. 4 is a flow chart illustrating a method of inputting up to eight sticky ones necessary to complete up to eight two's complement operations.

Referring to FIG. 4, a method of adding up to eight sticky ones to complete up to eight two's complement operations within a reduction tree is shown and commences at block 400. At block 400, a shift/sign extend unit receive a plurality of bytes. In a particular embodiment, the shift/sign extend unit receives eight bytes and each byte includes eight bits. In a particular embodiment, each byte corresponds to a sub word difference between two words. At block 402, the shift/sign extend unit splits each byte into a first portion and a second portion. In a particular embodiment, the first portion includes a first group of four bits, e.g., byte zero to byte three, and the second portion includes a second group of four bits, e.g., byte four to byte seven.

Moving to block 404, the shift/sign extend unit inputs the first portion of byte values to a first 4:2 compressor. In a particular embodiment, the first 4:2 compressor is a sixty-four bit compressor that includes four rows of sixty-four bits, e.g., zero to sixty-three. Further, in a particular embodiment the shift/sign extend unit inputs the first portion of the byte values to a first segment of the first 4:2 compressor, e.g., the least significant bits of the first 4:2 compressor. In a particular embodiment, the least significant bits of the first 4:2 compressor includes the least significant thirty-two bits of each row of the first 4:2 compressor, e.g., bit zero to bit thirty-one for each row.

Proceeding to block 406, the shift/sign extend unit inputs the second portion of byte values to a second 4:2 compressor. In a particular embodiment, the second 4:2 compressor is a sixty-four bit compressor and the shift/sign extend unit inputs the second portion of the byte values to a second portion of the second 4:2 compressor, e.g., the most significant bits of the second 4:2 compressor. The most significant bits of the second 4:2 compressor includes the most significant thirty-two bits of each row of the second 4:2 compressor, e.g., bit thirty-two to bit sixty-three for each row.

At block 408, the first 4:2 compressor performs a first 4:2 compression and carries in a first sticky one bit that is provided by a control module coupled to the first 4:2 compressor. In a particular embodiment, the first sticky one bit completes a first two's complement operation. Next, at block 410, the second 4:2 compressor performs a second 4:2 compression and generates a second sticky one bit therein. In a particular embodiment, the second sticky one bit is generated by adding two ones immediately adjacent to the beginning of two of the byte values within the second 4:2 compressor, e.g., within bit thirty-one of row one and within bit thirty-one of row two. As such, a second sticky one bit is carried over into the result of the 4:2 compression. The second sticky completes a second two's complement operation.

Proceeding to block 412, the first 4:2 compressor generates a first set of results. In a particular embodiment, the first set of results includes a first row and a second row. Further, in a particular embodiment, the second row is offset from the first row by one bit, i.e., the second row within the first set of results is offset by one bit to the left. As such, the second row includes an offset bit before bit zero of the second row and the offset bit is the least significant bit within the second row. Moving to block 414, the second 4:2 compressor generates a second set of results. In a particular embodiment, the second set of results includes a first row and a second row. Further, in a particular embodiment, the second row is offset from the first row by one bit, i.e., the second row within the second set of results is offset by one bit to the left.

Moving to block 416, the control module inputs a third sticky one bit to the second row of the first set of results, e.g., to the offset bit within the second row of the first set of results, in order to complete a third two's complement operation. At block 418, the control module inputs a fourth sticky one bit to the second row of the second set of results, e.g., to the offset bit within the second row of the second set of results, in order to complete a fourth two's complement operation. Continuing to block 420, the first 4:2 compressor inputs the first set of results, including the third sticky one bit to a first 3:2 compressor. At block 422, the second 4:2 compressor inputs the second set of results including the fourth sticky one bit to a second 3:2 compressor.

At block 424, the first 3:2 compressor performs a first 3:2 compression with the first set of results and a first accumulator value input from the control module. Further, at block 426, the second 3:2 compressor performs a second 3:2 compression with the second set of results and a second accumulator value that is input from the control module. Proceeding, to block 428, the first 3:2 compressor generates a third set of results that, in a particular embodiment, includes a first row and a second row that is offset to the left of the first row by one bit. At block 430, the second 3:2 compressor generates a fourth set of results that, in a particular embodiment, includes a first row and a second row that is offset relative to the left of the first row by one bit.

Proceeding to block 432, the control module adds a fifth sticky one bit to the second row of the first set of results in order to complete a fifth two's complement operation. Thereafter, at block 434, the control module adds a sixth sticky one bit to the second row of the fourth set of results in order to complete a sixth two's complement operation. Moving to block 436, the first 3:2 compressor inputs the third set of results to a first carry propagate adder (CPA). At block 438, the second 3:2 compressor inputs the fourth set of results to a second CPA.

Continuing to block 440, the first CPA performs a first CPA operation on the third set of results and carries in a seventh sticky one bit provided by the control module in order to complete a sixth two's complement operation. At block 442, the second CPA performs a second CPA operation on the fourth set of results and carries in an eighth sticky one bit in order to complete a eighth two's complement operation. Next, at block 444, the first CPA generates a fifth set of results. At block 446, the second CPA generates a sixth set of results. Proceeding to block 448, the first CPA writes the fifth set of results to a first portion of a sixty-four bit register, e.g., the first thirty-two bits of the sixty-four bit register or the bottom half of the sixty-four bit register. At block 450, the second CPA writes the sixth set of results to a second portion of the sixty-four bit register, e.g., the second thirty-two bits of the sixty-four bit register or the top half of the sixty-four bit register. The method then ends at state 452.

Figure 5:
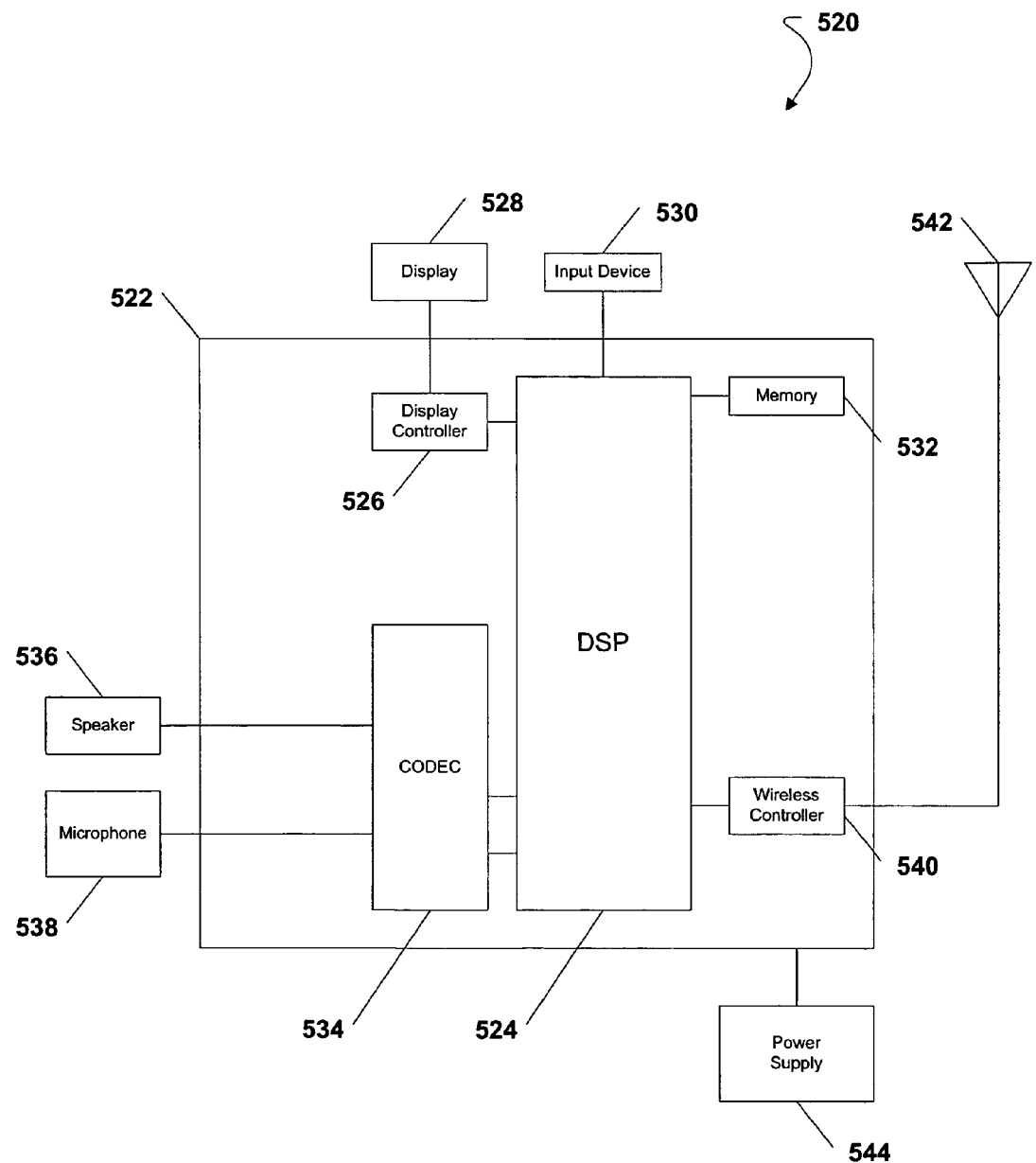
FIG. 5 is a general diagram of a portable communication device incorporating a digital signal processor.

FIG. 5 illustrates an exemplary, non-limiting embodiment of a portable communication device that is generally designated 520. As illustrated in FIG. 5, the portable communication device includes an on-chip system 522 that includes a digital signal processor 524. In a particular embodiment, the digital signal processor 524 is the digital signal processor shown in FIG. 1 and described herein. Further, in a particular embodiment, the digital signal processor 524 can include an instruction execution unit as illustrated in FIG. 2. FIG. 5 also shows a display controller 526 that is coupled to the digital signal processor 524 and a display 528. Moreover, an input device 530 is coupled to the digital signal processor 524. As shown, a memory 532 is coupled to the digital signal processor 524. Additionally, a coder/decoder (CODEC) 534 can be coupled to the digital signal processor 524. A speaker 536 and a microphone 538 can be coupled to the CODEC 534.

FIG. 5 also indicates that a wireless controller 540 can be coupled to the digital signal processor 524 and a wireless antenna 542. In a particular embodiment, a power supply 544 is coupled to the on-chip system 522. Moreover, in a particular embodiment, as illustrated in FIG. 5, the display 528, the input device 530, the speaker 536, the microphone 538, the wireless antenna 542, and the power supply 544 are external to the on-chip system 522. However, each is coupled to a component of the on-chip system 522.

In a particular embodiment, the digital signal processor 524 utilizes interleaved multithreading to process instructions associated with program threads necessary to perform the functionality and operations needed by the various components of the portable communication device 520. For example, when a wireless communication session is established via the wireless antenna a user can speak into the microphone 538. Electronic signals representing the user's voice can be sent to the CODEC 534 to be encoded. The digital signal processor 524 can perform data processing for the CODEC 534 to encode the electronic signals from the microphone. Further, incoming signals received via the wireless antenna 542 can be sent to the CODEC 534 by the wireless controller 540 to be decoded and sent to the speaker 536. The digital signal processor 524 can also perform the data processing for the CODEC 534 when decoding the signal received via the wireless antenna 542.

Further, before, during, or after the wireless communication session, the digital signal processor 524 can process inputs that are received from the input device 530. For example, during the wireless communication session, a user may be using the input device 530 and the display 528 to surf the Internet via a web browser that is embedded within the memory 532 of the portable communication device 520. The digital signal processor 524 can interleave various program threads that are used by the input device 530, the display controller 526, the display 528, the CODEC 534 and the wireless controller 540, as described herein, to efficiently control the operation of the portable communication device 520 and the various components therein. Many of the instructions associated with the various program threads are executed concurrently during one or more clock cycles. As such, the power and energy consumption due to wasted clock cycles is substantially decreased.

Figure 6:
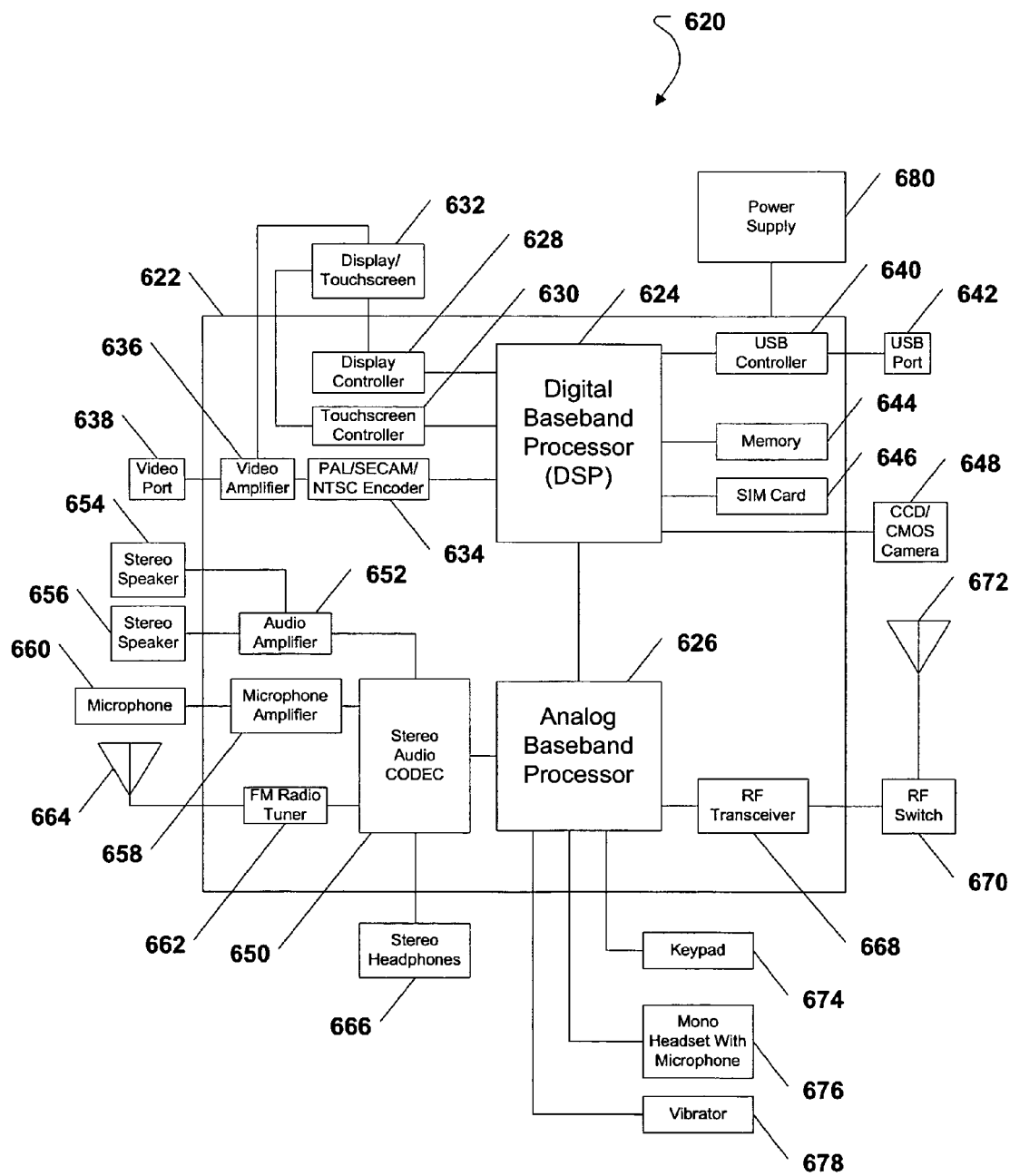
FIG. 6 is a general diagram of an exemplary cellular telephone incorporating a digital signal processor.

Referring to FIG. 6, an exemplary, non-limiting embodiment of a cellular telephone is shown and is generally designated 620. As shown, the cellular telephone 620 includes an on-chip system 622 that includes a digital baseband processor 624 and an analog baseband processor 626 that are coupled together. In a particular embodiment, the digital baseband processor 624 is a digital signal processor, e.g., the digital signal processor shown in FIG. 1 and described herein. Further, in a particular embodiment, the analog baseband processor 626 can also be a digital signal processor, e.g., the digital signal processor shown in FIG. 1. In a particular embodiment, each of the digital signal processors can include an instruction execution unit as illustrated in FIG. 2. As illustrated in FIG. 6, a display controller 628 and a touchscreen controller 630 are coupled to the digital baseband processor 624. In turn, a touchscreen display 632 external to the on-chip system 622 is coupled to the display controller 628 and the touchscreen controller 630.

FIG. 6 further indicates that a video encoder 634, e.g., a phase alternating line (PAL) encoder, a sequential couleur a memoire (SECAM) encoder, or a national television system(s) committee (NTSC) encoder, is coupled to the digital baseband processor 624. Further, a video amplifier 636 is coupled to the video encoder 634 and the touchscreen display 632. Also, a video port 638 is coupled to the video amplifier 636. As depicted in FIG. 6, a universal serial bus (USB) controller 640 is coupled to the digital baseband processor 624. Also, a USB port 642 is coupled to the USB controller 640. A memory 644 and a subscriber identity module (SIM) card 646 can also be coupled to the digital baseband processor 624. Further, as shown in FIG. 6, a digital camera 648 can be coupled to the digital baseband processor 624. In an exemplary embodiment, the digital camera 648 is a charge-coupled device (CCD) camera or a complementary metal-oxide semiconductor (CMOS) camera.

As further illustrated in FIG. 6, a stereo audio CODEC 650 can be coupled to the analog baseband processor 626. Moreover, an audio amplifier 652 can coupled to the to the stereo audio CODEC 650. In an exemplary embodiment, a first stereo speaker 654 and a second stereo speaker 656 are coupled to the audio amplifier 652. FIG. 6 shows that a microphone amplifier 658 can be also coupled to the stereo audio CODEC 650. Additionally, a microphone 660 can be coupled to the microphone amplifier 658. In a particular embodiment, a frequency modulation (FM) radio tuner 662 can be coupled to the stereo audio CODEC 650. Also, an FM antenna 664 is coupled to the FM radio tuner 662. Further, stereo headphones 666 can be coupled to the stereo audio CODEC 650.

FIG. 6 further indicates that a radio frequency (RF) transceiver 668 can be coupled to the analog baseband processor 626. An RF switch 670 can be coupled to the RF transceiver 668 and an RF antenna 672. As shown in FIG. 6, a keypad 674 can be coupled to the analog baseband processor 626. Also, a mono headset with a microphone 676 can be coupled to the analog baseband processor 626. Further, a vibrating device 678 can be coupled to the analog baseband processor 626. FIG. 6 also shows that a power supply 680 can be coupled to the on-chip system 622. In a particular embodiment, the power supply 680 is a direct current (DC) power supply that provides power to the various components of the cellular telephone 620 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 6, the touchscreen display 632, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrating device 678, and the power supply 680 are external to the on-chip system 622. Moreover, in a particular embodiment, the digital baseband processor 624 and the analog baseband processor 626 can use interleaved multithreading, described herein, in order to process the various program threads associated with one or more of the different components associated with the cellular telephone 620.

Figure 7:
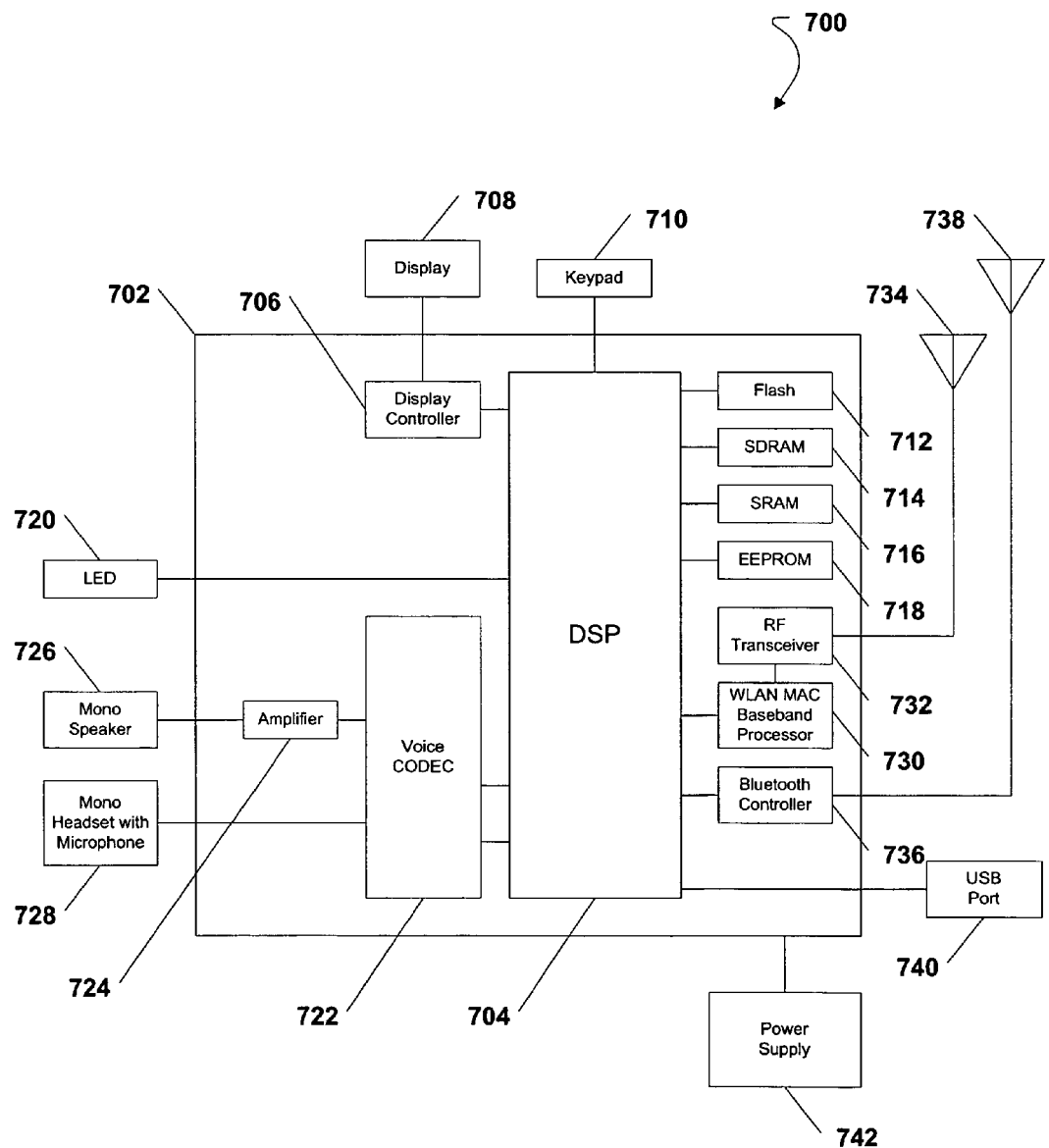
FIG. 7 is a general diagram of an exemplary wireless Internet Protocol telephone incorporating a digital signal processor.

Referring to FIG. 7, an exemplary, non-limiting embodiment of a wireless Internet protocol (IP) telephone is shown and is generally designated 700. As shown, the wireless IP telephone 700 includes an on-chip system 702 that includes a digital signal processor (DSP) 704. In a particular embodiment, the DSP 704 is the digital signal processor shown in FIG. 1 and described herein. Further, in a particular embodiment, the digital signal processor 704 can include an instruction execution unit as illustrated in FIG. 2. As illustrated in FIG. 7, a display controller 706 is coupled to the DSP 704 and a display 708 is coupled to the display controller 706. In an exemplary embodiment, the display 708 is a liquid crystal display (LCD). FIG. 7 further shows that a keypad 710 can be coupled to the DSP 704.

As further depicted in FIG. 7, a flash memory 712 can be coupled to the DSP 704. A synchronous dynamic random access memory (SDRAM) 714, a static random access memory (SRAM) 716, and an electrically erasable programmable read only memory (EEPROM) 718 can also be coupled to the DSP 704. FIG. 7 also shows that a light emitting diode (LED) 720 can be coupled to the DSP 704. Additionally, in a particular embodiment, a voice CODEC 722 can be coupled to the DSP 704. An amplifier 724 can be coupled to the voice CODEC 722 and a mono speaker 726 can be coupled to the amplifier 724. FIG. 7 further indicates that a mono headset 728 can also be coupled to the voice CODEC 722. In a particular embodiment, the mono headset 728 includes a microphone.

FIG. 7 also illustrates that a wireless local area network (WLAN) baseband processor 730 can be coupled to the DSP 704. An RF transceiver 732 can be coupled to the WLAN baseband processor 730 and an RF antenna 734 can be coupled to the RF transceiver 732. In a particular embodiment, a Bluetooth controller 736 can also be coupled to the DSP 704 and a Bluetooth antenna 738 can be coupled to the controller 736. FIG. 7 also shows that a USB port 740 can also be coupled to the DSP 704. Moreover, a power supply 742 is coupled to the on-chip system 702 and provides power to the various components of the wireless IP telephone 700 via the on-chip system 702.

In a particular embodiment, as indicated in FIG. 7, the display 708, the keypad 710, the LED 720, the mono speaker 726, the mono headset 728, the RF antenna 734, the Bluetooth antenna 738, the USB port 740, and the power supply 742 are external to the on-chip system 702. However, each of these components is coupled to one or more components of the on-chip system. Further, in a particular embodiment, the digital signal processor 704 can use interleaved multithreading, as described herein, in order to process the various program threads associated with one or more of the different components associated with the IP telephone 700.

Figure 8:
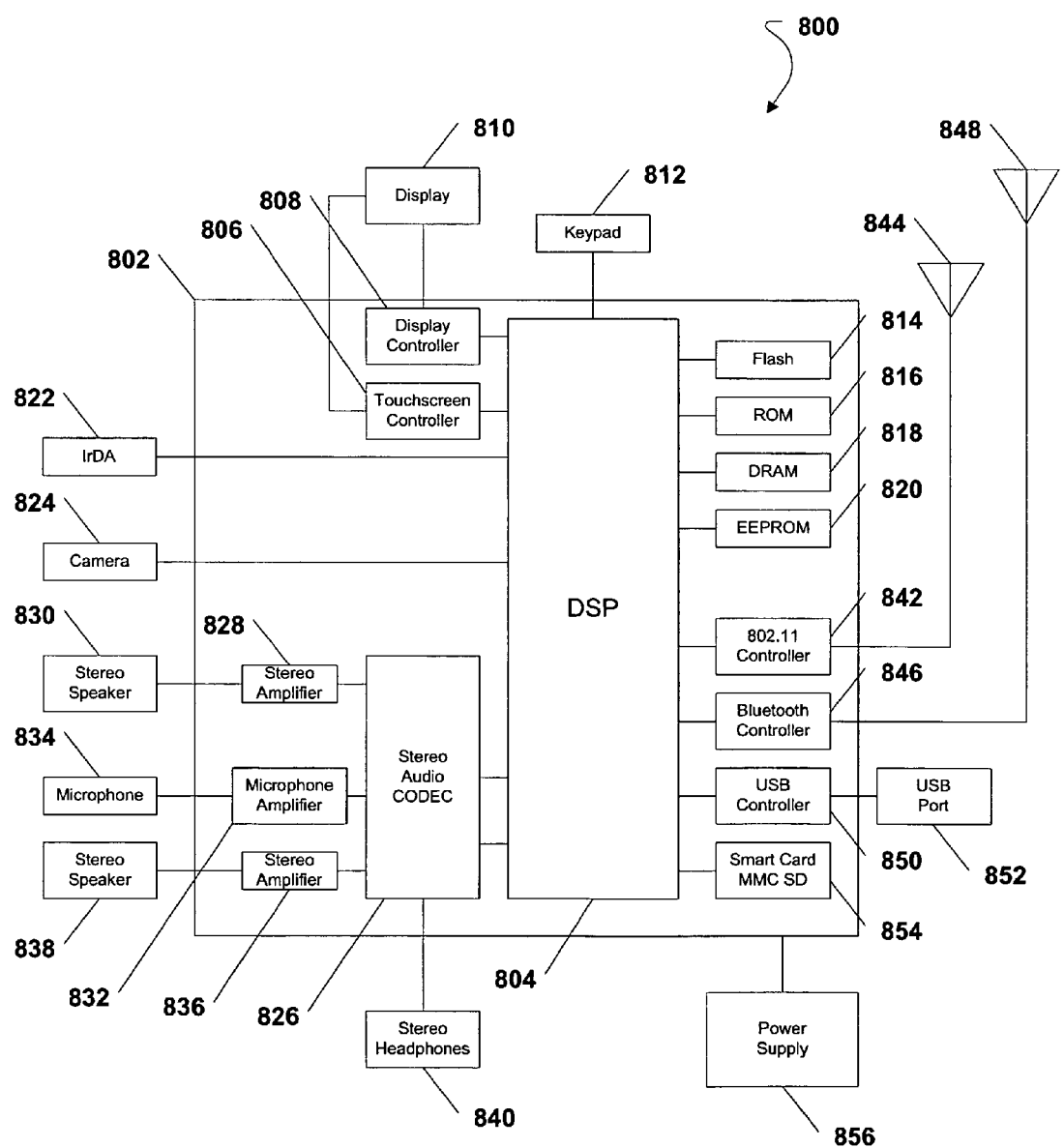
FIG. 8 is a general diagram of an exemplary portable digital assistant incorporating a digital signal processor.

FIG. 8 illustrates an exemplary, non-limiting embodiment of a portable digital assistant (PDA) that is generally designated 800. As shown, the PDA 800 includes an on-chip system 802 that includes a digital signal processor (DSP) 804. In a particular embodiment, the DSP 804 is the digital signal processor shown in FIG. 1 and described herein. Further, in a particular embodiment, the digital signal processor 804 can include an instruction execution unit as illustrated in FIG. 2. As depicted in FIG. 8, a touchscreen controller 806 and a display controller 808 are coupled to the DSP 804. Further, a touchscreen display 810 is coupled to the touchscreen controller 806 and to the display controller 808. FIG. 8 also indicates that a keypad 812 can be coupled to the DSP 804.

As further depicted in FIG. 8, a flash memory 814 can be coupled to the DSP 804. Also, a read only memory (ROM) 816, a dynamic random access memory (DRAM) 818, and an electrically erasable programmable read only memory (EEPROM) 820 can be coupled to the DSP 804. FIG. 8 also shows that an infrared data association (IrDA) port 822 can be coupled to the DSP 804. Additionally, in a particular embodiment, a digital camera 824 can be coupled to the DSP 804.

As shown in FIG. 8, in a particular embodiment, a stereo audio CODEC 826 can be coupled to the DSP 804. A first stereo amplifier 828 can be coupled to the stereo audio CODEC 826 and a first stereo speaker 830 can be coupled to the first stereo amplifier 828. Additionally, a microphone amplifier 832 can be coupled to the stereo audio CODEC 826 and a microphone 834 can be coupled to the microphone amplifier 832. FIG. 8 further shows that a second stereo amplifier 836 can be coupled to the stereo audio CODEC 826 and a second stereo speaker 838 can be coupled to the second stereo amplifier 836. In a particular embodiment, stereo headphones 840 can also be coupled to the stereo audio CODEC 826.

FIG. 8 also illustrates that an 802.11 controller 842 can be coupled to the DSP 804 and an 802.11 antenna 844 can be coupled to the 802.11 controller 842. Moreover, a Bluetooth controller 846 can be coupled to the DSP 804 and a Bluetooth antenna 848 can be coupled to the Bluetooth controller 846. As depicted in FIG. 8, a USB controller 850 can be coupled to the DSP 804 and a USB port 852 can be coupled to the USB controller 850. Additionally, a smart card 854, e.g., a multimedia card (MMC) or a secure digital card (SD) can be coupled to the DSP 804. Further, as shown in FIG. 8, a power supply 856 can be coupled to the on-chip system 802 and can provide power to the various components of the PDA 800 via the on-chip system 802.

In a particular embodiment, as indicated in FIG. 8, the display 810, the keypad 812, the IrDA port 822, the digital camera 824, the first stereo speaker 830, the microphone 834, the second stereo speaker 838, the stereo headphones 840, the 802.11 antenna 844, the Bluetooth antenna 848, the USB port 852, and the power supply 850 are external to the on-chip system 802. However, each of these components is coupled to one or more components on the on-chip system 802. Additionally, in a particular embodiment, the digital signal processor 804 can use interleaved multithreading, described herein, in order to process the various program threads associated with one or more of the different components associated with the portable digital assistant 800.

Figure 9:
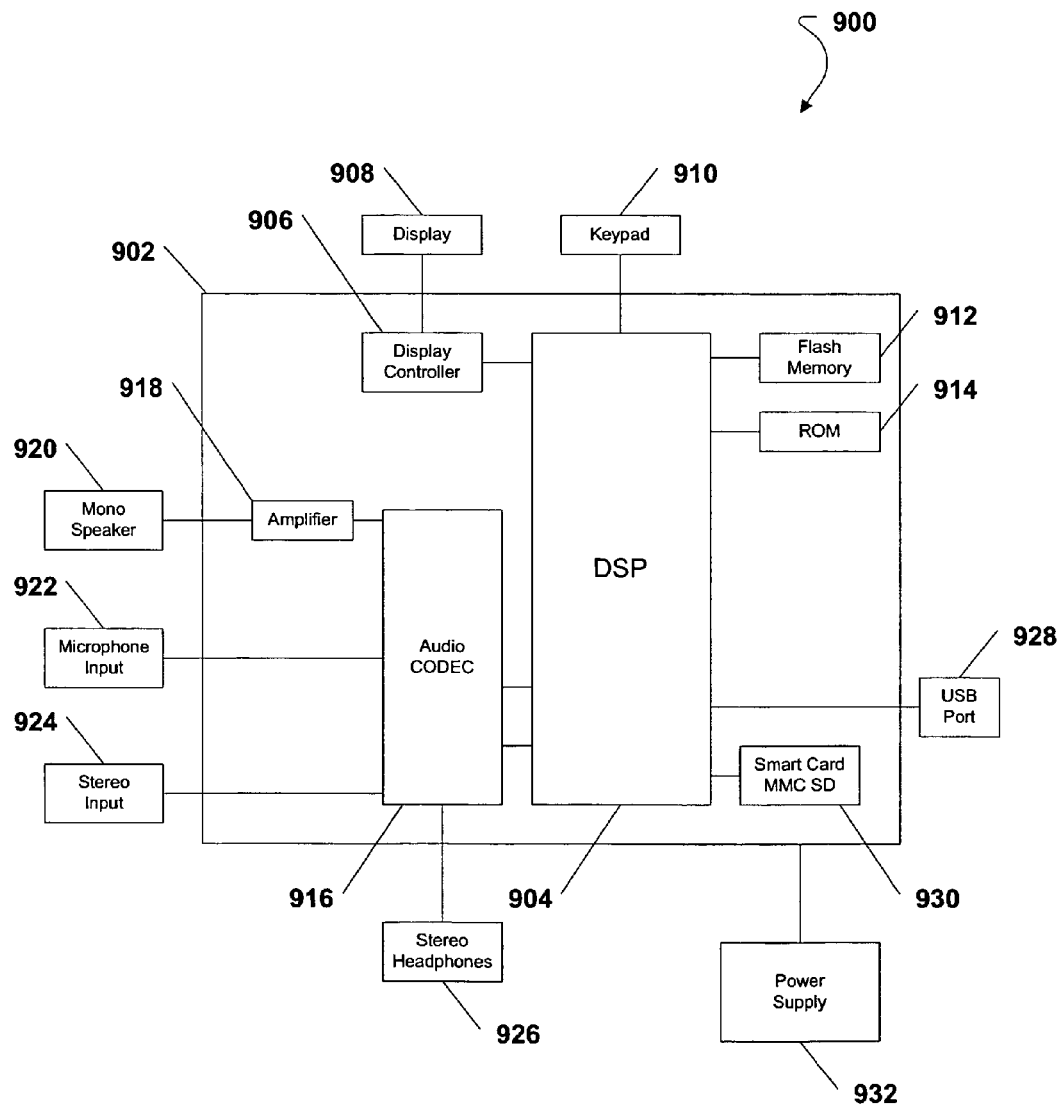
FIG. 9 is a general diagram of an exemplary audio file player incorporating a digital signal processor.

Referring to FIG. 9, an exemplary, non-limiting embodiment of an audio file player, such as moving pictures experts group audio layer-3 (MP3) player is shown and is generally designated 900. As shown, the audio file player 900 includes an on-chip system 902 that includes a digital signal processor (DSP) 904. In a particular embodiment, the DSP 904 is the digital signal processor shown in FIG. 1 and described herein. Further, in a particular embodiment, the digital signal processor 904 can include an instruction execution unit as illustrated in FIG. 2. As illustrated in FIG. 9, a display controller 906 is coupled to the DSP 904 and a display 908 is coupled to the display controller 906. In an exemplary embodiment, the display 908 is a liquid crystal display (LCD). FIG. 9 further shows that a keypad 910 can be coupled to the DSP 904.

As further depicted in FIG. 9, a flash memory 912 and a read only memory (ROM) 914 can be coupled to the DSP 904. Additionally, in a particular embodiment, an audio CODEC 916 can be coupled to the DSP 904. An amplifier 918 can be coupled to the audio CODEC 916 and a mono speaker 920 can be coupled to the amplifier 918. FIG. 9 further indicates that a microphone input 922 and a stereo input 924 can also be coupled to the audio CODEC 916. In a particular embodiment, stereo headphones 926 can also be coupled to the audio CODEC 916.

FIG. 9 also indicates that a USB port 928 and a smart card 930 can be coupled to the DSP 904. Additionally, a power supply 932 can be coupled to the on-chip system 902 and can provide power to the various components of the audio file player 900 via the on-chip system 902.

In a particular embodiment, as indicated in FIG. 9, the display 908, the keypad 910, the mono speaker 920, the microphone input 922, the stereo input 924, the stereo headphones 926, the USB port 928, and the power supply 932 are external to the on-chip system 902. However, each of these components is coupled to one or more components on the on-chip system 902. Also, in a particular embodiment, the digital signal processor 904 can use interleaved multithreading, described herein, in order to process the various program threads associated with one or more of the different components associated with the audio file player 900.

With the configuration of structure disclosed herein, the system and method described herein provides a way to complete up to eight two's complement operations while simultaneously performing multiple byte reduction operations. As such, the need for extra hardware to complete the two's complement operations is obviated.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of completing a two's complement operation, the method comprising:
receiving a plurality of byte values;
splitting, by a splitting logic, the plurality of byte values into a first portion and a second portion;
inputting the first portion to a first segment of a first four-to-two compressor, wherein the first portion occupies the least significant bits of each row of the first four-to-two compressor;
inputting a first bit value of one as a carry-in value to the first four-to-two compressor to perform a first stage of a two's complement operation;
performing, by a compression logic, a first four-to-two compression operation on the first portion to generate a first set of results having a first row and a second row, the second row offset one bit from the first row, wherein the first row includes a first bit corresponding to at least part of a sum of each low order bit of each byte value of the first portion; and
inputting a second bit value of one to an offset bit position of the second row of the first set of results in order to perform a second stage of the two's complement operation.

2. The method of claim 1, further comprising:
inputting the second portion to a second segment of a second four-to-two compressor, wherein the second segment of the second four-to-two compressor comprises most significant bits and a first segment of the second four-to-two compressor comprises least significant bits, wherein the first four-to-two compressor and the second four-to-two compressor are not coupled together;
adding two bit values of one to the first segment in a bit position immediately to the right of the second segment in order to carry in a third bit value of one to the second portion to perform a third stage of the two's complement operation; and
performing a second four-to-two compression operation on the second portion to generate a second set of results having a first row and a second row, the second row offset one bit from the first row.

3. The method of claim 2, further comprising inputting a fourth bit value of one to an offset bit position of the second row of the second set of results in order to perform a fourth stage of the two's complement operation.

4. The method of claim 3, further comprising:
inputting the first set of results to a first three-to-two compressor along with a first accumulator value; and
performing a first three-to-two compression operation on the first set of results and the first accumulator value to generate a third set of results having a first row and a second row, the second row offset one bit from the first row.

5. The method of claim 4, further comprising:
inputting the second set of results to a second three-to-two compressor along with a second accumulator value; and
performing a second three-to-two compression operation on the second set of results and the second accumulator value to generate a fourth set of results having a first row and a second row, the second row offset one bit from the first row.

6. The method of claim 5, further comprising inputting a fifth bit value of one to an offset bit position of the second row of the third set of results in order to perform a fifth stage of the two's complement operation.

7. The method of claim 6, further comprising inputting a sixth bit value of one to an offset bit position of the second row of the fourth set of results in order to perform a sixth stage of the two's complement operation.

8. The method of claim 7, further comprising:
inputting the third set of results to a first carry propagate adder (CPA); and
performing a first CPA operation on the third set of results.

9. The method of claim 8, further comprising:
carrying in a seventh bit value of one in order to perform a seventh stage of the two's complement operation; and
generating a fifth set of results.

10. The method of claim 9, further comprising:
inputting the fourth set of results to a second carry propagate adder (CPA); and performing a second CPA operation on the fourth set of results.

11. The method of claim 10, further comprising:
carrying in an eighth bit value of one in order to perform an eighth stage of the two's complement operation;
generating a sixth set of results;
writing the fifth set of results to a first portion of a register; and
writing the sixth set of results to a second portion of the register.

12. An instruction execution unit comprising:
a first four-to-two compressor; and
a control module coupled to the first four-to-two compressor, wherein the control module comprises:
    logic to split eight byte values into a first group of four byte values and a second group of four byte values, wherein each value of the first group of four byte values and each value of the second group of four byte values correspond to sub word difference values to be summed;
    logic to use the first four-to-two compressor to compress the first group of four byte values to a first set of results having a first row and a second row, the second row offset one bit from the first row;
    logic to carry-in a first bit value of one while compressing the first group of four byte values in order to perform a first stage of a two's complement operation; and
    logic to input a second bit value of one to an offset bit position of the second row within the first set of results in order to perform a second stage of the two's complement operation.

13. The instruction execution unit of claim 12, further comprising:
a second four-to-two compressor coupled to the control module, wherein the control module further comprises:
    logic to use the second four-to-two compressor to compress the second group of four byte values to a second set of results having a first row and a second row, the second row offset one bit from the first row;
    logic to add two bit values of one to a bit position within the second four-to-two compressor in order to carry in a third bit value of one to the second group of four byte values while compressing the second group of four byte values in order to perform a third stage of the two's complement operation; and
    logic to input a fourth bit value of one to an offset bit position of the second row within the second set of results in order to perform a fourth stage of the two's complement operation.

14. The instruction execution unit of claim 13, further comprising:
a first three-to-two compressor coupled to the control module; and
a second three-to-two compressor coupled to the control module, wherein the control module further comprises:
    logic to use the first three-to-two compressor to compress the first set of results and a first accumulator value to generate a third set of results having a first row and a second row, the second row offset one bit from the first row;
    logic to use the second three-to-two compressor to compress the second set of results and a second accumulator value to generate a fourth set of results having a first row and a second row, the second row offset one bit from the first row;
    logic to input a fifth bit value of one to an offset bit position of the second row within the third set of results in order to perform a fifth stage of the two's complement operation; and
    logic to input a sixth bit value of one to an offset bit position of the second row within the fourth set of results in order to perform a sixth stage of the two's complement operation.

15. The instruction execution unit of claim 14, further comprising:
a first carry propagate adder; and
a second carry propagate adder, wherein the control module further comprises:
    logic to use the first carry propagate adder to add the first row and second row of the third set of results;
    logic to carry in a seventh bit value of one while adding the first row and the second row of the third set of results in order to perform a seventh stage of the two's complement operation;
    logic to use the second carry propagate adder to add the first row and the second row of the fourth set of results; and
    logic to carry in an eighth bit value of one while adding the first row and the second row of the fourth set of results in order to perform an eighth stage of the two's complement operation.

16. A digital signal processor comprising:
a memory;
a sequencer responsive to the memory;
a register file coupled to the memory; and
an instruction execution unit responsive to the sequencer, wherein the instruction execution unit comprises:
    a first four-to-two compressor;
    a second four-to-two compressor;
    a first three-to-two compressor coupled to the first four-to-two compressor;
    a second three-to-two compressor coupled to the second four-to-two compressor;
    a first carry propagate adder coupled to the first three-to-two compressor;
    a second carry propagate adder coupled to the second three-to-two compressor; and
    a control module coupled to the first four-to-two compressor, the second four-to-two compressor, the first three-to-two compressor, the second three-to-two compressor, the first carry propagate adder, and the second carry propagate adder, wherein the control module comprises:
        logic to split eight byte values into a first group of four byte values and a second group of four byte values, wherein each value of the first group of four byte values and each value of the second group of four byte values correspond to operands of a sum of absolute differences;
        logic to use the first four-to-two compressor to compress the first group of four byte values to a first set of results having a first row and a second row, the second row offset one bit from the first row;
        logic to carry-in a first bit value of one while compressing the first group of four byte values in order to perform a first stage of a two's complement operation; and
        logic to input a second bit value of one to an offset bit position of the second row within the first set of results in order to perform a second stage of the two's complement operation.

17. The digital signal processor of claim 16, wherein the control module further comprises:
- logic to use the second four-to-two compressor to compress the second group of four byte values to a second set of results having a first row and a second row, the second row offset one bit from the first row;
- logic to add two bit values of one to a bit position within the second four-to-two compressor in order to carry in a third bit value of one to the second group of four byte values while compressing the second group of four byte values in order to perform a third stage of the two's complement operation; and
- logic to input a fourth bit value of one to an offset bit position of the second row within the second set of results in order to perform a fourth stage of the two's complement operation.

18. The digital signal processor of claim 17, wherein the control module further comprises:
- logic to use the first three-to-two compressor to compress the first set of results and a first accumulator value to generate a third set of results having a first row and a second row, the second row offset one bit from the first row;
- logic to use the second three-to-two compressor to compress the second set of results and a second accumulator value to generate a fourth set of results having a first row and a second row, the second row offset one bit from the first row;
- logic to input a fifth bit value of one to an offset bit position of the second row within the third set of results in order to perform a fifth stage of the two's complement operation; and
- logic to input a sixth bit value of one to an offset bit position of the second row within the fourth set of results in order to perform a sixth stage of the two's complement operation.

19. The digital signal processor of claim 18, wherein the control module further comprises:
- logic to use the first carry propagate adder to add the first row and the second row of the third set of results;
- logic to carry in a seventh bit value of one while adding the first row and the second row of the third set of results in order to perform a seventh stage of the two's complement operation;
- logic to use the second carry propagate adder to add the first row and the second row of the fourth set of results; and
- logic to carry in an eighth bit value of one while adding the first row and the second row of the fourth set of results in order to perform an eighth stage of the two's complement operation.

20. A processor device comprising:
- means for receiving a plurality of byte values;
- means for splitting the plurality of byte values into a first portion of byte values and a second portion of byte values;
- means for inputting the first portion of byte values to a bottom half of a first four-to-two compressor, wherein the first portion of byte values occupies the least significant bits of each row of the first four-to-two compressor;
- means for inputting a first bit value of one as a carry-in value to the first four-to-two compressor to perform a first stage of a two's complement operation;
- means for performing a first four-to-two compression operation on the first portion of byte values to generate a first set of results having a first row and a second row that is offset one bit from the first row, wherein the first row includes a first bit corresponding to at least part of a sum of each low order bit of each byte value of the first portion; and
- means for inputting a second bit value of one to an offset bit position of the second row of the first set of results in order to perform a second stage of the two's complement operation.

21. The method of claim 1, wherein the plurality of byte values comprises a plurality of 64-bit words, wherein the first portion and the second portion are each 32 bits wide.

22. The method of claim 21, further comprising inputting sign extension bits to a second segment of the first four-to-two compressor corresponding to a sign bit of the first portion in the first segment, wherein the second segment of the first four-to-two compressor comprises most significant bits and the first segment of the first four-to-two compressor comprises least significant bits.

23. The method of claim 1, wherein each of the plurality of byte values is an inverted difference value.

24. The instruction execution unit of claim 12, wherein the control module further comprises logic to extend the sign bit of each of the first group of four byte values by 32 bits.

25. The instruction execution unit of claim 24, wherein the sign extended portion of the first group of four byte values is also provided to the first four-to-two compressor.

26. The digital signal processor of claim 16, wherein the control module further comprises logic to extend the sign bit of each of the first group of four byte values by 32 bits.

27. The digital signal processor of claim 26, wherein the sign extended portion of the first group of four byte values is also provided to the first four-to-two compressor.

28. The method of claim 1, wherein a sum result of each low order bit of each byte value of the first portion is represented by the first bit of the first row and a bit of the second row.

29. A non-transitory computer-readable medium comprising instructions that, when executed by a processor, cause the processor to:
- receive a plurality of byte values;
- split the plurality of byte values into a first portion of byte values and a second portion of byte values;
- input the first portion of byte values to a bottom half of a first four-to-two compressor, wherein the first portion of byte values occupies the least significant bits of each row of the first four-to-two compressor;
- input a first bit value of one as a carry-in value to the first four-to-two compressor to perform a first stage of a two's complement operation;
- perform a first four-to-two compression operation on the first portion of byte values to generate a first set of results having a first row and a second row that is offset one bit from the first row, wherein the first row includes a first bit corresponding to at least part of a sum of each low order bit of each byte value of the first portion; and
- input a second bit value of one to an offset bit position of the second row of the first set of results in order to perform a second stage of the two's complement operation.

30. The non-transitory computer-readable medium of claim 29, further comprising instructions that, when executed by the processor, cause the processor to:
- input the second portion to a second segment of a second four-to-two compressor, wherein the second segment of the second four-to-two compressor comprises most significant bits and a first segment of the second four-to-two compressor comprises least significant bits, wherein the first four-to-two compressor and the second four-to-two compressor are not coupled together;

add two bit values of one to the first segment in a bit position immediately to the right of the second segment in order to carry in a third hit value of one to the second portion to perform a third stage of the two's complement operation; and perform a second four-to-two compression operation on the second portion to generate a second set of results having a first row and a second row, the second row offset one bit from the first row.

31. The non-transitory computer-readable medium of claim 30, further comprising instructions that, when executed by the processor, cause the processor to input a fourth bit value of one to an offset hit position of the second row of the second set of results in order to perform a fourth stage of the twos complement operation.

32. The non-transitory computer-readable medium of claim 31, further comprising instructions that, when executed by the processor, cause the processor to:

input the first set of results along with a first accumulator value to a first three-to-two compressor; and perform a first three-to-two compression operation on the first set of results and the first accumulator value to generate a third set of results.

33. The non-transitory computer-readable medium of claim 32, further comprising instructions that, when executed by the processor, cause the processor to:

input the second set of results along with a second accumulator value to a second three-to-two compressor; and perform a second three-to-two compression operation on the second set of results and the second accumulator value to generate a fourth set of results.

* * * * *